(12) United States Patent
Kamiya

(10) Patent No.: US 11,674,551 B2
(45) Date of Patent: Jun. 13, 2023

(54) LUBRICANT SUPPLY DEVICE, METHOD FOR MANUFACTURING THE SAME, AND ROLLING SLIDING DEVICE

(71) Applicant: JTEKT CORPORATION, Kariya (JP)

(72) Inventor: Toru Kamiya, Kashiwara (JP)

(73) Assignee: JTEKT CORPORATION, Kariya (JP)

( * ) Notice: Subject to any disclaimer, the term of this patent is extended or adjusted under 35 U.S.C. 154(b) by 14 days.

(21) Appl. No.: 17/565,855

(22) Filed: Dec. 30, 2021

(65) Prior Publication Data

US 2022/0221004 A1    Jul. 14, 2022

(30) Foreign Application Priority Data

Jan. 8, 2021   (JP) .............................. JP2021-002255

(51) Int. Cl.
*F16C 19/06* (2006.01)
*F16C 33/66* (2006.01)

(52) U.S. Cl.
CPC .......... *F16C 33/6648* (2013.01); *F16C 19/06* (2013.01); *F16C 33/6611* (2013.01); *F16N 2210/14* (2013.01); *F16N 2270/24* (2013.01)

(58) Field of Classification Search
CPC .. F16C 19/06; F16C 33/6611; F16C 33/6648; F16N 2210/14; F16N 2270/24
See application file for complete search history.

(56) References Cited

U.S. PATENT DOCUMENTS

| | | | | |
|---|---|---|---|---|
| 1,533,184 | A | * | 4/1925 | Gurney ............... F16C 33/6648 277/423 |
| 2002/0027044 | A1 | * | 3/2002 | Michioka ............. B23Q 11/124 184/5 |
| 2015/0030274 | A1 | * | 1/2015 | Adane ..................... F16C 19/04 384/469 |

FOREIGN PATENT DOCUMENTS

| | | | |
|---|---|---|---|
| DE | 4336075 A1 | * 4/1995 | .......... F16C 33/6611 |
| JP | 2017-133684 A | 8/2017 | |

* cited by examiner

*Primary Examiner* — Phillip A Johnson
(74) *Attorney, Agent, or Firm* — Oliff PLC

(57) ABSTRACT

A lubricant supply device includes a porous body including a first porous portion and a second porous portion in contact with the first porous portion, the porous body being impregnated with a lubricant. A penetration depth of the lubricant in the second porous portion is larger than a penetration depth of the lubricant in the first porous portion.

14 Claims, 9 Drawing Sheets

LUBRICANT SUPPLY DEVICE, METHOD FOR MANUFACTURING THE SAME, AND ROLLING SLIDING DEVICE

CROSS-REFERENCE TO RELATED APPLICATION

This application claims priority to Japanese Patent Application No. 2021-002255 filed on Jan. 8, 2021, incorporated herein by reference in its entirety.

BACKGROUND

1. Technical Field

The present disclosure relates to a lubricant supply device, a method for manufacturing the same, and a rolling sliding device.

2. Description of Related Art

Japanese Unexamined Patent Application Publication No. 2017-133684 (JP 2017-133684 A) discloses a lubricant supply device capable of supplying a base oil contained in grease to a target portion. The lubricant supply device includes a lubricant storage member in which a storage chamber filled with grease is formed, and a permeation member made of a porous body having continuous pores. In the lubricant supply device, the base oil (lubricant) contained in the grease filling the storage chamber can be permeated into the permeation member, and the lubricant can be discharged little by little from the permeation member. When the permeation member is provided at a position adjacent to the inside of a rolling bearing, the lubricant can be supplied to the inside of the rolling bearing for a long period of time.

SUMMARY

In the lubricant supply device, although soly a component needs to perform lubrication is the base oil (lubricant) contained in the grease, since the grease obtained by synthesizing a thickener and the base oil is used, a cost is higher than when soly the lubricant is used. Further, in the lubricant supply device, the grease in the device may fall off or be scattered due to vibration or impact, and thus, there is a concern that the grease may adhere to an unwanted place around the device. As described above, the grease is used in the lubricant supply device, and thus, there are problems.

Therefore, the present disclosure provides a lubricant supply device capable of supplying a lubricant to a target portion without using grease, a method for manufacturing the same, and a rolling sliding device including the lubricant supply device.

A first aspect of the present disclosure relates to a lubricant supply device including a porous body including a first porous portion and a second porous portion in contact with the first porous portion, the porous body being impregnated with a lubricant. A penetration depth of the lubricant in the second porous portion is larger than a penetration depth of the lubricant in the first porous portion.

A second aspect of the present disclosure relates to a method for manufacturing a lubricant supply device including a porous body including a first porous portion and a second porous portion in contact with the first porous portion, the porous body being impregnated with a lubricant, a penetration depth of the lubricant of the second porous portion being larger than a penetration depth of the lubricant of the first porous portion. The method includes compressing one porous material to form the porous body including the second porous portion that is the compressed portion of the one porous material and the first porous portion that is a portion having a smaller degree of compression than that of the second porous portion.

A third aspect of the present disclosure relates to a method for manufacturing a lubricant supply device including a porous body including a first porous portion and a second porous portion in contact with the first porous portion, the porous body being impregnated with a lubricant, a penetration depth of the lubricant of the second porous portion being larger than a penetration depth of the lubricant of the first porous portion. The method includes bringing a first porous body constituting the first porous portion and a second porous body constituting the second porous portion into close contact with each other to form the porous body.

A fourth aspect of the present disclosure relates to a rolling sliding device including a first rolling sliding member that has a first rolling sliding portion, a second rolling sliding member that has a second rolling sliding portion, a lubricant supply device, and a contact portion. In the contact portion, the first rolling sliding portion and the second rolling sliding portion come into contact with each other in at least one mode of rolling contact and sliding contact. A lubricant is supplied from the lubricant supply device to the contact portion. The lubricant supply device has a first porous portion, a second porous portion continuous with the first porous portion, and a porous body which is impregnated with the lubricant. A penetration depth of the lubricant in the second porous portion is larger than a penetration depth of the lubricant in the first porous portion. The distance between the second porous portion and the contact portion is smaller than the distance between the first porous portion and the contact portion.

With the lubricant supply device of the present disclosure, it is possible to supply the lubricant to a target portion without using the grease.

With the method for manufacturing a lubricant supply device of the present disclosure, it is possible to easily manufacture the lubricant supply device that does not use the grease.

With the rolling sliding device of the present disclosure, it is possible to supply the lubricant to the contact portion of each rolling sliding portion without using the grease.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outlines of Embodiments of Present Disclosure

Figure 1:
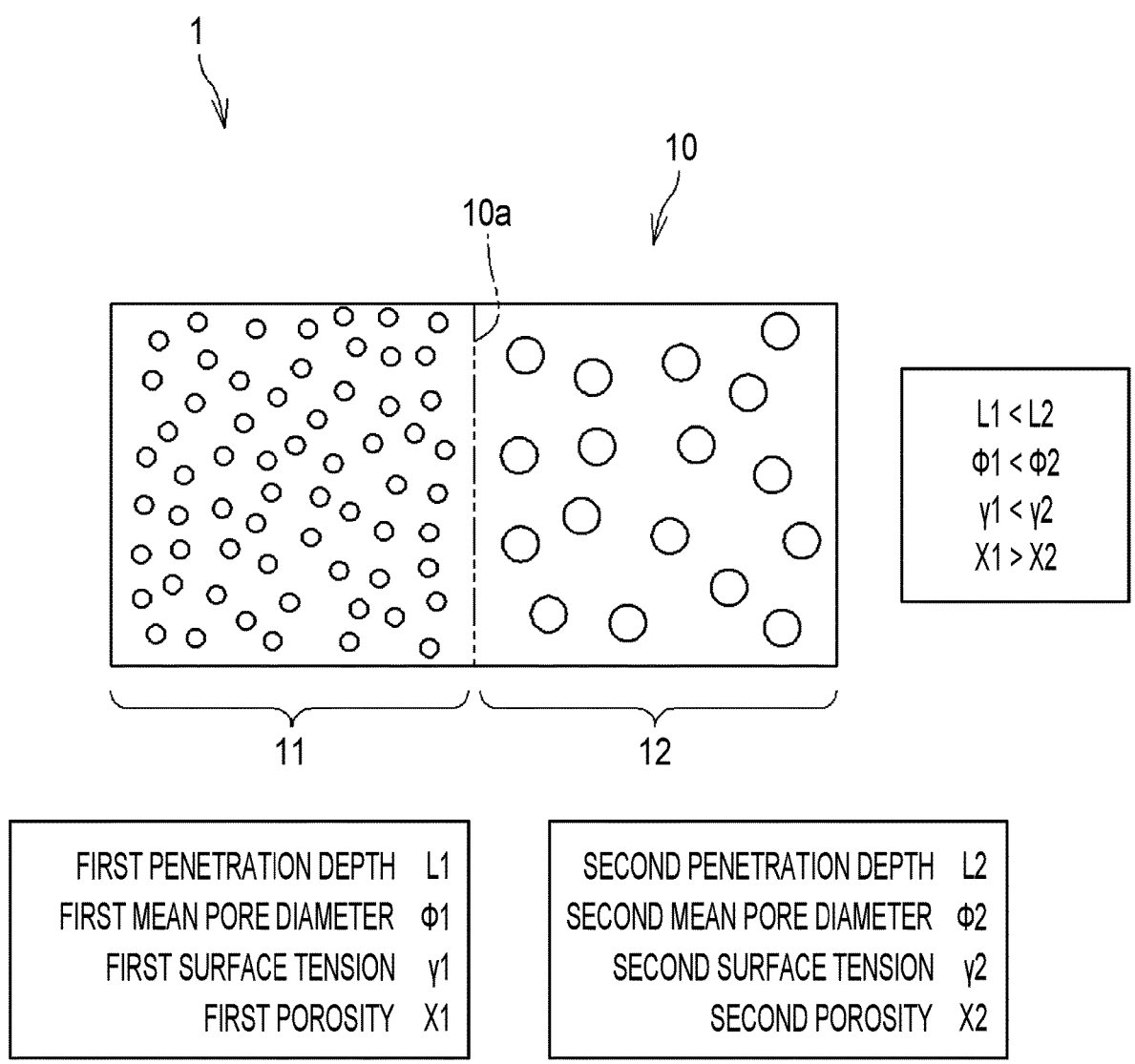
FIG. 1 is a schematic view of a lubricant supply device.

Hereinafter, outlines of embodiments of the present disclosure will be listed and described. A lubricant supply device of the present embodiment includes a first porous portion, a second porous portion in contact with the first porous portion, and a porous body which is impregnated with a lubricant, in which a penetration depth of the lubricant in the second porous portion is larger than a penetration depth of the lubricant in the first porous portion.

With the lubricant supply device of the present embodiment, the lubricant with which the first porous portion is impregnated can be absorbed by the second porous portion using a capillary phenomenon. Further, with the lubricant supply device of the present embodiment, the first porous portion and the second porous portion can play the same role as the thickener in the grease and retain the lubricant in the porous body. Therefore, the lubricant stored in the first porous portion can be supplied to the second porous portion, and the lubricant can be supplied from the second porous portion to a target portion without using the grease.

Further, since the penetration depth of the lubricant in the second porous portion is larger than the penetration depth of the lubricant in the first porous portion, the first porous portion may have a first mean pore diameter, and the second porous portion may have a second mean pore diameter that is larger than the first mean pore diameter. In this case, the lubricant with which the first porous portion is impregnated can be absorbed by the second porous portion using the capillary phenomenon.

Further, since the penetration depth of the lubricant in the second porous portion is larger than the penetration depth of the lubricant in the first porous portion, the first porous portion may have a first surface tension and the second porous portion may have a second surface tension that is larger than the first surface tension. In this case, the lubricant with which the first porous portion is impregnated can be absorbed by the second porous portion using the capillary phenomenon.

Further, the first porous portion may have a first porosity and the second porous portion may have a second porosity that is smaller than the first porosity. In this case, the amount of lubricant retained per unit volume in the first porous portion can be larger than that in the second porous portion. Accordingly, it is easy to secure the amount of lubricant retained in the porous body.

Further, each of the first porous portion and the second porous portion may be a portion of one porous body. In this case, the lubricant supply device can be formed of one porous body. Therefore, a manufacturing cost of the lubricant supply device can be reduced.

Further, the first porous portion may be formed of a first porous body, and the second porous portion may be formed of a second porous body separated from the first porous body. In this case, by configuring the lubricant supply device with a plurality of porous bodies having different properties, it is possible to improve a degree of freedom in controlling a supply amount of the lubricant. Further, it is possible to manufacture the lubricant supply device by combining different materials, and thus, it is possible to improve a degree of freedom in material selection.

A method for manufacturing a lubricant supply device of the present embodiment including a first porous portion, a second porous portion in contact with the first porous portion, and a porous body which is impregnated with a lubricant, a penetration depth of the lubricant of the second porous portion being larger than a penetration depth of the lubricant of the first porous portion, the method for manufacturing a lubricant supply device includes compressing one porous material to from the porous body including the second porous portion that is the compressed portion of the one porous material and the first porous portion that is a portion having a smaller degree of compression than that of the second porous portion.

With the method for manufacturing a lubricant supply device of the present embodiment, it is possible to easily manufacture the lubricant supply device having the first porous portion and the second porous portion soly by compressing one porous material. Therefore, the manufacturing cost of the lubricant supply device can be reduced.

A method for manufacturing a lubricant supply device of the present embodiment is a method for manufacturing a lubricant supply device including a first porous portion, a second porous portion in contact with the first porous portion, and a porous body which is impregnated with a lubricant, a penetration depth of the lubricant of the second porous portion being larger than a penetration depth of the lubricant of the first porous portion. The method for manufacturing a lubricant supply device includes bringing a first porous body constituting the first porous portion and a second porous body constituting the second porous portion into close contact with each other to form the porous body.

With the method for manufacturing the lubricant supply device of the present embodiment, the porous body can be easily manufactured by arbitrarily combining the first porous body and the second porous body having different properties. Therefore, the degree of freedom in controlling the supply amount of the lubricant can be improved. Further, it is possible to manufacture a lubricant supply device by combining different materials, and it is possible to improve the degree of freedom in material selection.

A rolling sliding device of the present embodiment includes a first rolling sliding member that has a first rolling sliding portion, a second rolling sliding member that has a second rolling sliding portion, a lubricant supply device, and a contact portion in which the first rolling sliding portion and the second rolling sliding portion come into contact with each other in at least one mode of rolling contact and sliding contact, in which a lubricant is supplied from the lubricant supply device to the contact portion. The lubricant supply device has a first porous portion, a second porous portion continuous with the first porous portion, and a porous body which is impregnated with the lubricant, a penetration depth of the lubricant in the second porous portion is larger than a penetration depth of the lubricant in the first porous portion, and a distance between the second porous portion and the contact portion is smaller than a distance between the first porous portion and the contact portion.

With the rolling sliding device of the present embodiment, in the rolling sliding device including the lubricant supply device, the lubricant can be supplied to the contact portion of each rolling sliding portion without using grease. Therefore, when the rolling sliding device is used, there is no possibility that the grease falls off or is scattered and adheres to an unwanted portion.

Further, when the rolling sliding device is a rolling bearing including an inner ring that is the first rolling sliding member, an outer ring that is the second rolling sliding member, and a rolling element disposed between the inner ring and the outer ring, an inner ring raceway that is the first rolling sliding portion and an outer ring raceway that is the second rolling sliding portion may be the contact portion that is in contact with the rolling element in at least one mode of the rolling contact and sliding contact, and the porous body may be disposed at an axial end portion of the inner ring or the outer ring. In this case, in the rolling bearing including the lubricant supply device, the lubricant can be supplied to the contact portion between the inner ring and the outer ring and the rolling element without using the grease.

Further, the porous body may be disposed at each of both axial end portions of the inner ring or the outer ring. In this case, the lubricant can be supplied to the contact portion from both sides in the axial direction. Therefore, uneven supply of the lubricant to the contact portion can be suppressed in the axial direction. Further, the porous body can be used as a substitute for a sealing device to suppress leakage of the lubricant from the inside of the bearing to the outside thereof.

Further, the porous body may be fixed to a fixed ring out of the inner ring and the outer ring. In this case, in the rolling bearing including the lubricant supply device, the lubricant can be stably supplied to the contact portion regardless of the rotation of a rotating ring of the outer ring or the inner ring.

Further, the rolling sliding device may further include an annular member that is fixed to an axial end portion of the fixed ring out of the inner ring and the outer ring, and the porous body may be disposed between an axially inner side of the annular member and the fixed ring and sandwiched by the annular member and the fixed ring. In this case, in the rolling bearing including lubricant supply device, the porous body can be easily provided at the axial end portion of the fixed ring.

Further, the annular member may be disposed at each of both axial end portions of the fixed ring. In this case, in the rolling bearing including lubricant supply device, the porous body can be easily provided at each of both axial end portions of the fixed ring.

Details of Embodiments of Present Disclosure

Hereinafter, details of embodiments of the present disclosure will be described with reference to the drawings. In addition, at least some of the embodiments described below may be arbitrarily combined.

Overall Configuration of Lubricant Supply Device 1

Figure 2:
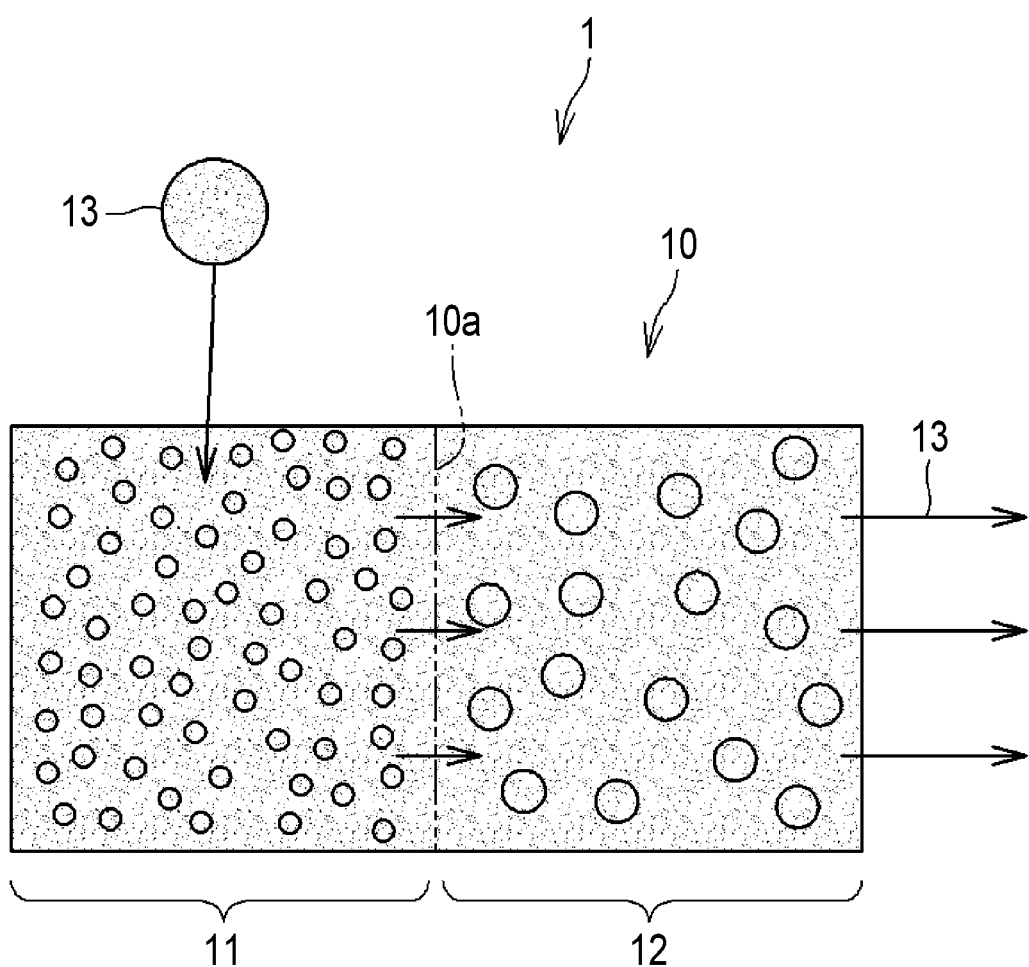
FIG. 2 is a schematic view of a porous body constituting the lubricant supply device.

A lubricant supply device according to the embodiments of the present disclosure will be described. FIG. 1 is a schematic view of a lubricant supply device 1 according to one embodiment of the present disclosure. FIG. 2 is a schematic view of a porous body 10 constituting the lubricant supply device 1. The lubricant supply device 1 shown in FIG. 1 is an embodiment of the lubricant supply device according to the present disclosure, and includes the porous body 10. As shown in FIG. 2, the lubricant supply device 1 is used in a state where the porous body 10 is impregnated with a lubricant 13. Examples of the lubricant 13 used in the lubricant supply device 1 may include a lubricant used for lubricating a rolling sliding device and a base oil contained in grease. In the present embodiment, in any of a state where the porous body 10 is not impregnated with the lubricant 13 (refer to FIG. 1) and a state where the porous body 10 is impregnated with the lubricant (refer to FIG. 2), the device is referred to as the lubricant supply device 1.

As shown in FIGS. 1 and 2, the porous body 10 is a member made of a porous material, and has a first porous portion 11 and a second porous portion 12. In the porous body 10, the first porous portion 11 and the second porous portion 12 are continuous with each other, and a virtual boundary portion 10a is formed between the first porous portion 11 and the second porous portion 12.

Examples of the porous material constituting the porous body 10 may include a sintered body, a foaming material, or a fiber material. Examples of a material of the porous material may include a thermoplastic polymer material, such as polyethylene, polyamide, or polyphenylene sulfide, a metal material, or a ceramic material. Considering heat resistance, examples of the material may include a porous material made of metal, such as stainless alloy, a copper alloy, or a nickel alloy. The porous material made of metal constituting the porous body 10 may be a metal sintered material formed by sintering a metal powder in order to form a large number of continuous pores.

The first porous portion 11 is a portion that mainly has a function of storing the lubricant 13 and has a function of supplying the lubricant 13 to the second porous portion 12. The second porous portion 12 is a portion that mainly has a function of storing the lubricant 13 supplied from the first porous portion 11 and has a function of supplying the lubricant 13 to the outside of the porous body 10. In the porous body 10, the first porous portion 11 and the second porous portion 12 are made of porous materials having different properties. Specifically, the first porous portion 11 and the second porous portion 12 have different penetration depths described below.

The first porous portion 11 and the second porous portion 12 are made of porous materials having different penetration depths L calculated by the following Lucas-Washburn formula (Equation 1). The Lucas-Washburn formula is a dominant logical formula of a capillary phenomenon, and according to the equation, a penetration depth L of a liquid in an object can be calculated. In symbols used in Equation 1, L indicates the penetration depth, r indicates a capillary radius, γ indicates a surface tension, θ indicates a contact angle, t indicates a time, and η indicates a liquid kinematic viscosity.

$$L = \sqrt{\frac{r\gamma \cos\theta \times t}{2\eta}}$$

When two members having different penetration depths L are disposed in succession, the liquid with which each member is impregnated moves to the member having the larger penetration depth L due to the capillary phenomenon. In the porous body 10 shown in FIG. 1, a second penetration depth L2 of the second porous portion 12 is larger than a first penetration depth L1 of the first porous portion 11. Therefore, in the porous body 10, the lubricant 13 (liquid) with which the first porous portion 11 is impregnated moves beyond the boundary portion 10a to the second porous portion 12. The term "impregnation" as used herein means a state in which the liquid has penetrated into the pores of the porous body 10.

Method for Adjusting Penetration Depth L

Here, a method for adjusting the penetration depth L of each of the first porous portion 11 and the second porous portion 12 will be described. As can be seen from Equation 1, the larger the penetration depth L, the larger the capillary radius r. In the porous body 10, a pore diameter of each of the pores formed in the porous body 10 corresponds to the capillary radius r in Equation 1. Therefore, in the lubricant supply device 1, a magnitude relationship of the penetration depths L of the first porous portion 11 and the second porous portion 12 is adjusted by adjusting a mean pore diameter $\varphi 1$ of the first porous portion 11 and a mean pore diameter $\varphi 2$ of the second porous portion 12.

In the lubricant supply device 1 of the present disclosure, the mean pore diameter $\varphi 2$ of the second porous portion 12 is larger than the mean pore diameter $\varphi 1$ of the first porous portion 11. Therefore, in the lubricant supply device 1, the second penetration depth L2 of the second porous portion 12 is larger than the first penetration depth L1 of the first porous portion 11 (L1<L2). In the porous body 10 having the configuration, the lubricant 13 with which the first porous portion 11 is impregnated moves beyond the boundary portion 10a to the second porous portion 12.

As described above, in the lubricant supply device 1, the first porous portion 11 has the first mean pore diameter $\varphi 1$, and the second porous portion 12 has the second mean pore diameter $\varphi 2$ that is larger than the first mean pore diameter of $\varphi 1$. With the lubricant supply device 1, the lubricant 13 with which the first porous portion 11 is impregnated can be absorbed by the second porous portion 12 using the capillary phenomenon.

Further, as can be seen from the Equation 1, the larger the penetration depth L, the larger the surface tension $\gamma$. The surface tension of the porous body 10 is determined depending on the material of the porous body 10. Therefore, in the lubricant supply device 1, the magnitude relationship of the penetration depths L of the first porous portion 11 and the second porous portion 12 are adjusted by changing the material of the porous material constituting each of the first porous portion 11 and the second porous portion 12.

In the lubricant supply device 1, a second surface tension $\gamma 2$ of the porous material constituting the second porous portion 12 is larger than a first surface tension $\gamma 1$ of the porous material constituting the first porous portion 11. When comparing an organic material, such as a resin, with metal, in general, the organic material is larger in surface tension than the metal. Therefore, for example, by forming the first porous portion 11 with metal and the second porous portion 12 with a resin, the second surface tension $\gamma 2$ can be made larger than the first surface tension $\gamma 1$. In the porous body 10 having the configuration, the second penetration depth L2 of the second porous portion 12 is larger than the first penetration depth L1 of the first porous portion 11 (L1<L2), and thus, the lubricant 13 with which the first porous portion 11 is impregnated moves beyond the boundary portion 10a to the second porous portion 12. In other words, the lubricant 13 moves from the first porous portion 11 side that has a lower lipophilicity and is formed of metal to the second porous portion 12 side that has higher lipophilicity and is formed of a resin.

As described above, in the lubricant supply device 1 of the present disclosure, the first porous portion 11 has the first surface tension $\gamma 1$, and the second porous portion 12 has the second surface tension $\gamma 2$ larger than the first surface tension $\gamma 1$. With the lubricant supply device 1, the lubricant 13 with which the first porous portion 11 is impregnated can be absorbed by the second porous portion 12 using the capillary phenomenon.

In the descriptions, the case is described in which both the capillary radius r (mean pore diameters $\varphi 1$, $\varphi 2$) and the surface tension $\gamma$ (surface tensions $\gamma 1$, $\gamma 2$) are adjusted in order to adjust the penetration depth L of the porous body 10. However, at least one of the capillary radius r and the surface tension $\gamma$ may be adjusted in order to adjust the penetration depth L.

Porosity

In the porous body 10, the first porous portion 11 and the second porous portion 12 have different porosities. The porosity is a ratio of a volume of pores contained in each of the porous portions 11, 12 to a volume of each of the porous portions 11, 12. In the porous body 10, the first porous portion 11 mainly plays a role of storing the lubricant 13. Therefore, in the porous body 10, a first porosity X1 of the first porous portion 11 is larger than a second porosity X2 of the second porous portion 12. With the configuration, the amount of the lubricant 13 per unit volume retained in the first porous portion 11 can be made larger than that in the second porous portion 12.

In the porous body 10, preferably, the first porosity X1 and the second porosity X2 are 50 vol % to 90 vol % while having the above-described magnitude relationships. In the porous body 10, the first porosity X1 is preferably 85 vol % to 90 vol %. This value of "85 vol % to 90 vol %" is substantially equal to the porosity of a thickener contained in the grease. With the configuration, the first porous portion 11 plays the same role as the thickener. Therefore, in the first porous portion 11, it is possible to secure substantially the same amount of retained lubricant 13 as when the grease is used. Then, the amount of lubricant 13 retained in the first porous portion 11 can be made larger than the amount of the lubricant 13 retained in the second porous portion 12.

As described above, in the lubricant supply device 1, the first porous portion 11 has the first porosity X1, and the second porous portion 12 has the second porosity X2 that is smaller than the first porosity X1. In this case, the amount of the lubricant 13 per unit volume retained in the first porous portion 11 can be made larger than that in the second porous portion 12. Therefore, it is easy to secure the amount of lubricant 13 retained in the porous body 10.

The lubricant supply device 1 of the present disclosure described above includes the first porous portion 11, the second porous portion 12 that is in contact with the first porous portion 11, and the porous body 10 which is impregnated with the lubricant 13. In the lubricant supply device 1, the second penetration depth L2 of the lubricant 13 in the second porous portion 12 is larger than the first penetration depth L1 of the lubricant 13 in the first porous portion 11. In this case, the lubricant 13 with which the first porous portion 11 is impregnated can be absorbed by the second porous portion 12 using the capillary phenomenon. Further, in this case, each of the first porous portion 11 and the second porous portion 12 can play the same role as the thickener in the grease and retain the lubricant 13 in the porous body 10. Accordingly, the lubricant 13 stored in the first porous portion 11 can be supplied to the second porous portion 12, and the lubricant 13 can be supplied from the second porous portion 12 to the target portion without using grease.

Method for Manufacturing Porous Body 10

Figure 3:
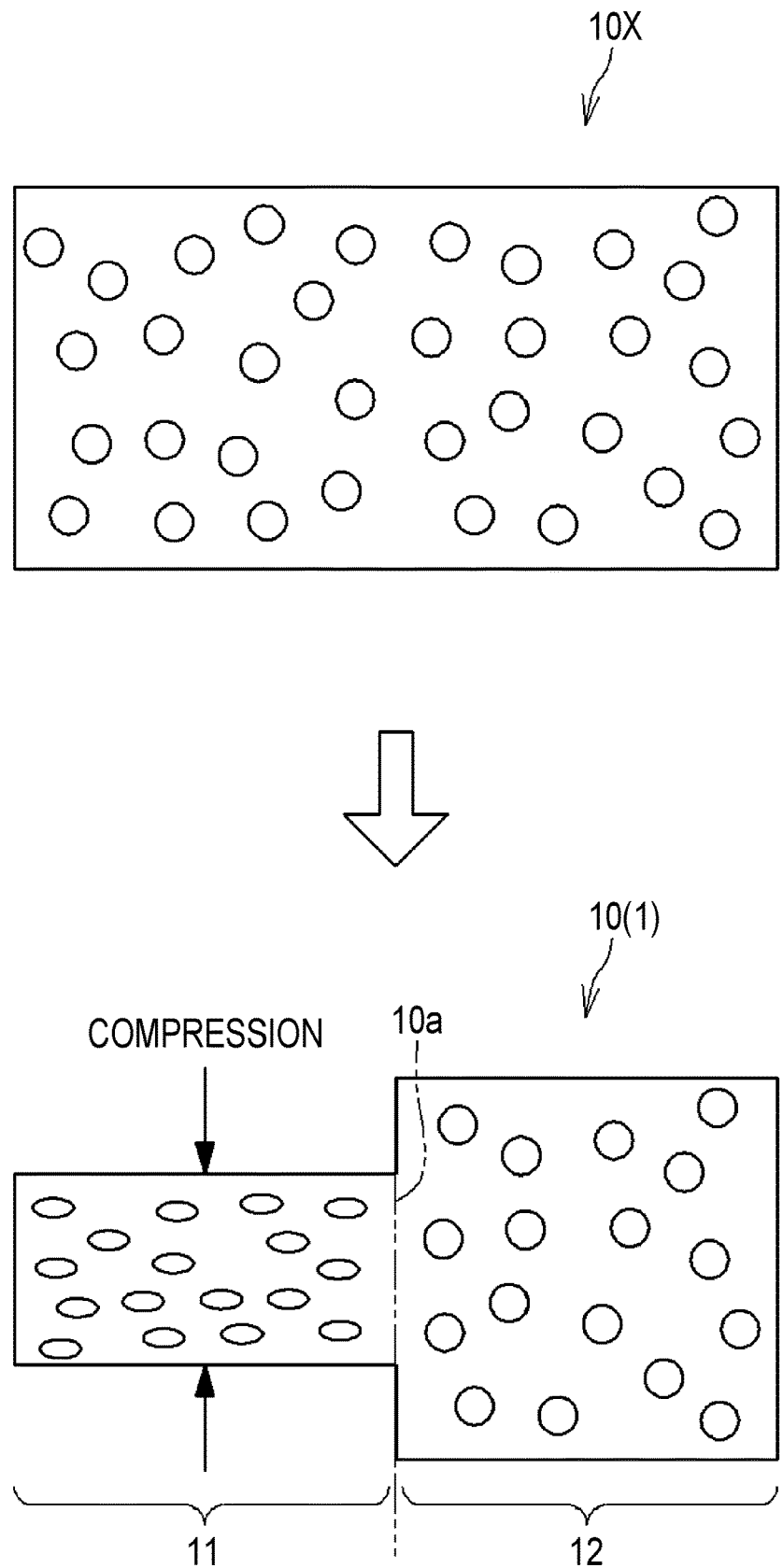
FIG. 3 is a schematic view showing a method for manufacturing a porous body according to a first embodiment.

FIG. 3 is a schematic view showing a method for manufacturing the porous body 10 according to a first embodiment. The upper figure of FIG. 3 shows a porous material 10X that is a source of the porous body 10. The porous material 10X is a porous material in which continuous pores (pores) are formed. As the porous material 10X, it is preferable to use a material that can be plastically deformed, such as metal. Regarding the porous body 10 manufactured by this manufacturing method, when a desired mean pore diameter of the first porous portion 11 is the mean pore diameter $\varphi 1$, and a desired mean pore diameter of the second porous portion 12 is the mean pore diameter φ2, the porous material 10X uses a porous material having the mean pore diameter φ2.

The lower figure of FIG. 3 shows the porous body 10 manufactured from the porous material 10X. In the method for manufacturing the porous body 10 according to the first embodiment, a portion of the porous material 10X is compressed such that the portion is plastically deformed. At this time, the compression is performed so that the mean pore diameter of the compressed portion is the mean pore diameter φ1. The compressed portion of the porous material 10X becomes the first porous portion 11. When a material, such as a resin that is not plastically deformed, is used as the porous material 10X, a portion of the compressed porous material 10X may be fitted into a frame body such that the deformed shape is maintained by the frame body.

Further, in the porous material 10X, a portion other than the compressed portion becomes the second porous portion 12. As described above, in the method for manufacturing the porous body 10 according to the first embodiment, it is possible to manufacture the porous body 10 having the first porous portion 11 and the second porous portion 12 that are formed by partially compressing one porous material 10X.

In the present embodiment, the case where the second porous portion 12 is manufactured from the uncompressed portion of the porous material 10X is described. However, the second porous portion 12 may be manufactured by compressing the portion other than the compressed portion with a small degree of compression smaller than that of the compressed portion. In this case, as the porous material 10X, a porous material having a mean pore diameter larger than the mean pore diameter φ2 is used. Further, FIG. 3 illustrates the case where the porous material 10X is compressed in one direction (up-down direction in FIG. 3) to manufacture the porous body 10. However, the porous material 10X may be compressed in another direction (for example, right-left direction in FIG. 3) to deform the portion. Further, in the present embodiment, the case where the porous material 10X is compressed and deformed is described. However, a tensile force may be applied to the porous material 10X to deform the porous material 10X.

In the method for manufacturing the porous body 10 (lubricant supply device 1) according to the first embodiment described above, by compressing one porous material 10X, the porous body 10 is formed, which includes the first porous portion 11 that is the compressed portion and the second porous portion 12 that is the portion having a smaller degree of compression than that of the first porous portion 11. In this case, the porous body 10 (lubricant supply device 1) having the first porous portion 11 and the second porous portion 12 can be easily manufactured soly by compressing one porous material 10X. Further, in the porous body 10 (lubricant supply device 1) manufactured by the manufacturing method according to the first embodiment, each of the first porous portion 11 and the second porous portion 12 is a portion of one porous body 10. In this case, one porous body 10 can constitute the lubricant supply device 1. Accordingly, a manufacturing cost of the lubricant supply device 1 can be reduced.

Figure 4:
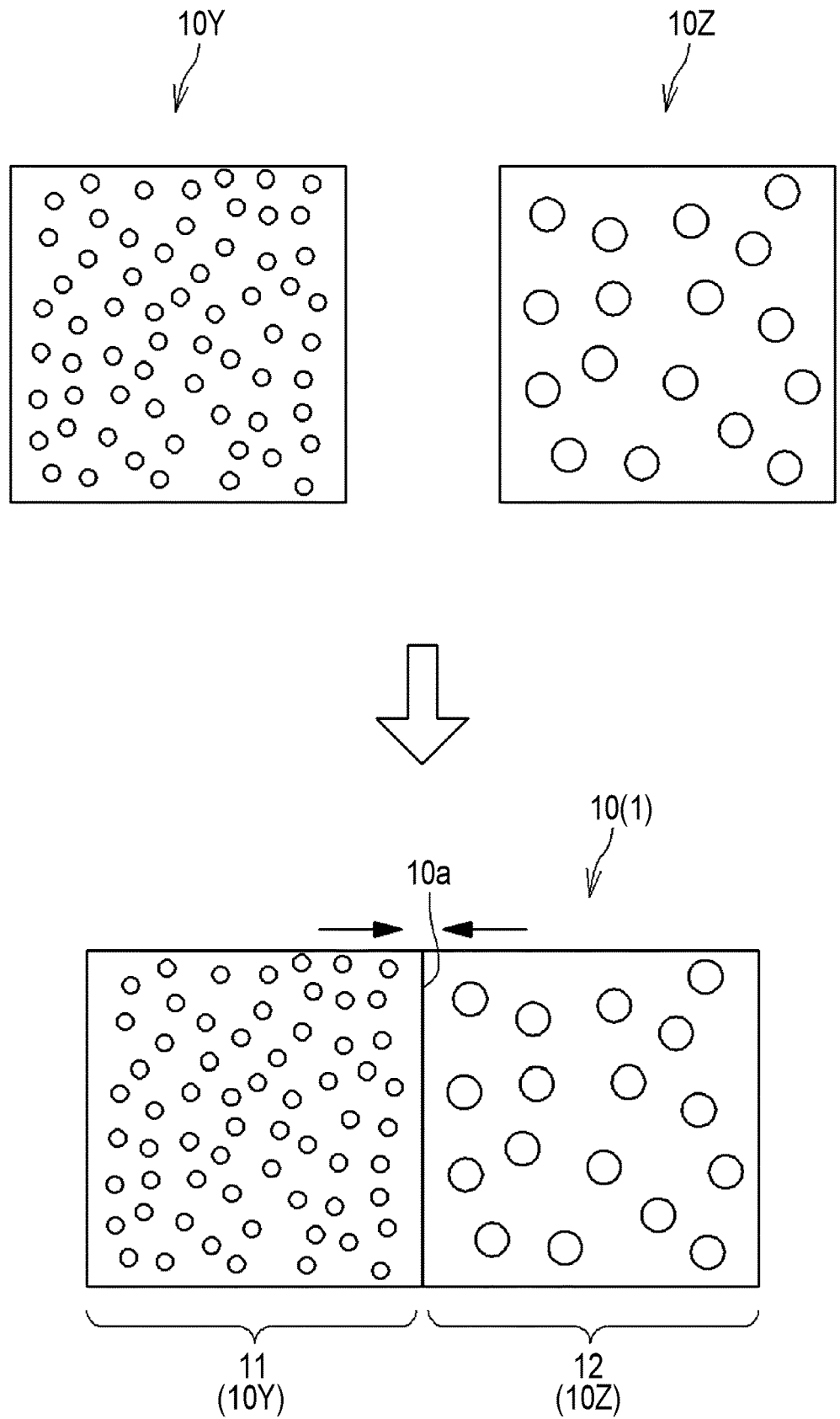
FIG. 4 is a schematic view showing a method for manufacturing a porous body according to a second embodiment.

FIG. 4 is a schematic view showing a method for manufacturing the porous body 10 according to a second embodiment. The upper figure of FIG. 4 shows a first porous material 10Y and a second porous material 10Z, which are the sources of the porous body 10. Regarding the porous body 10 manufactured by this manufacturing method, when a desired mean pore diameter of the first porous portion 11 is the mean pore diameter φ1, and a desired mean pore diameter of the second porous portion 12 is the mean pore diameter φ2, the first porous material 10Y uses the porous material having the mean pore diameter φ1 and the second porous material 10Z uses the porous material having the mean pore diameter φ2.

The lower figure of FIG. 4 shows the porous body 10 manufactured from the first porous material 10Y and the second porous material 10Z. In the method for manufacturing the porous body 10 according to the second embodiment, the porous body 10 is manufactured by bringing the first porous material 10Y and the second porous material 10Z into close contact with each other. In the porous body 10, a portion formed of the first porous material 10Y becomes the first porous portion 11, and a portion formed of the second porous material 10Z becomes the second porous portion 12. In the porous body 10, the mean pore diameter of the portion formed of the first porous material 10Y is the mean pore diameter φ1, and the mean pore diameter of the portion formed of the second porous material 10Z is the mean pore diameter φ2.

In the porous body 10 manufactured by the manufacturing method according to the second embodiment, the first porous material 10Y and the second porous material 10Z may be in close contact (continuous) with each other, and the first porous material 10Y and the second porous material 10Z may be integrally joined to each other by a method, such as welding or adhesion, or may be joined to each other by simply pressing against each other in a separate state.

The first porous material 10Y and the second porous material 10Z used in the method for manufacturing the porous body 10 according to the second embodiment may be different materials. That is, in the manufacturing method according to the second embodiment, the porous body 10 can be manufactured according to 1) both the first porous material 10Y and the second porous material 10Z being metal, 2) both the first porous material 10Y and the second porous material 10Z being a resin, or 3) one of the first porous material 10Y and the second porous material 10Z being a resin and the other being metal. Further, in the manufacturing method according to the second embodiment, the porous body 10 may be manufactured according to 4) the first porous material 10Y and the second porous material 10Z being dissimilar metals or 5) the first porous material 10Y and the second porous material 10Z being different types of resins.

In the method for manufacturing the porous body 10 (lubricant supply device 1) according to the second embodiment described above, the porous body 10 is formed by bringing the first porous material 10Y constituting the first porous portion 11 and the second porous material 10Z constituting the second porous portion 12 into close contact with each other. In this case, the porous body 10 can be easily manufactured by arbitrarily combining the first porous material 10Y and the second porous material 10Z having different properties. Further, in the porous body 10 (lubricant supply device 1) manufactured by the manufacturing method according to the second embodiment, the first porous portion 11 is formed of the first porous material 10Y, and the second porous portion 12 is formed of the second porous material 10Z separated from the first porous material 10Y. In this case, the lubricant supply device 1 can be formed of the plurality of porous materials 10Y, 10Z having different properties. Then, with the manufacturing method according to the second embodiment and the porous body 10 manufactured by the manufacturing method, it is possible to improve a degree of freedom in controlling a supply amount of the lubricant 13, it is possible to manufacture the lubricant supply device 1 by combining different materials, and thus, it is possible to improve a degree of freedom in material selection.

Rolling Sliding Device Having Lubricant Supply Device 1.

Figure 5:
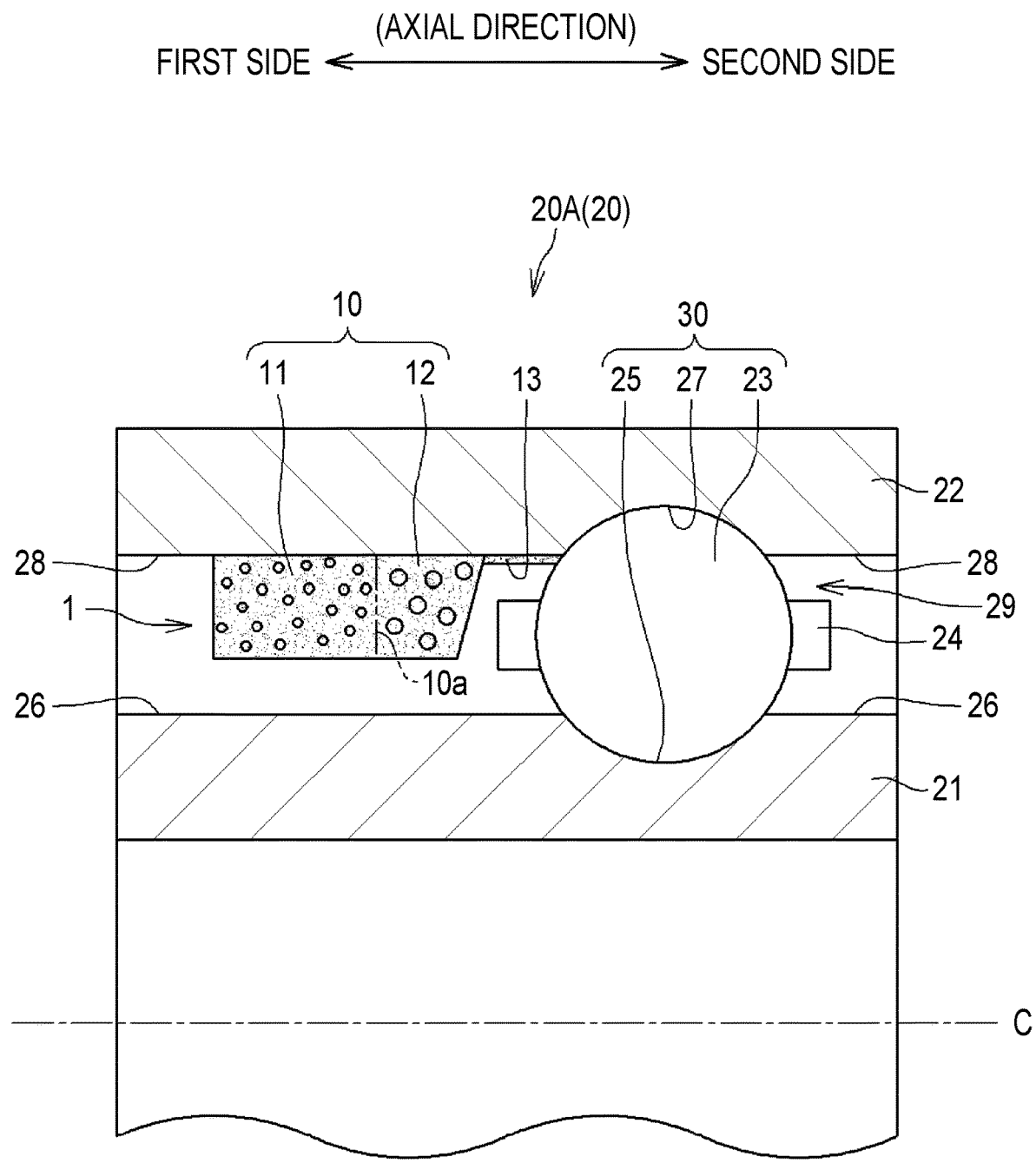
FIG. 5 is a schematic view showing a first rolling bearing provided with the lubricant supply device.

Here, a rolling sliding device having the lubricant supply device 1 will be described. In the present embodiment, a rolling bearing will be described as an example of the rolling sliding device. FIG. 5 is a cross-sectional view of a rolling bearing 20 and shows a cross section including a center line C (also referred to as a "bearing center line C") of the rolling bearing 20. In the following description, when the term "rolling bearing 20" is simply referred to, configurations common to the rolling bearings 20 of each of the following embodiments are described.

The rolling bearing 20 shown in FIG. 5 includes an inner ring 21, an outer ring 22, and a plurality of rolling elements provided between the inner ring 21 and the outer ring 22. The rolling element of the present disclosure is a ball 23, and the rolling bearing 20 is a ball bearing (deep groove ball bearing). In the rolling bearing 20 shown in FIG. 5, the inner ring 21 is a rotating ring and the outer ring 22 is a fixed ring. Further, the rolling bearing 20 includes a cage 24 for holding the ball 23. The rolling bearing 20 includes the lubricant supply device 1 in which the porous body 10 is impregnated with the lubricant 13. The rolling bearing 20 is lubricated by the lubricant 13 supplied from the lubricant supply device 1.

In the present disclosure, an "axial direction", a "radial direction", and a "circumferential direction" in each description of the inner ring 21 and the outer ring 22 are defined. The "axial direction" is a direction along a center line of each of the inner ring 21 and the outer ring 22. The axial direction also includes a direction parallel to the center line. The "radial direction" is a direction orthogonal to the center line of each of the inner ring 21 and the outer ring 22. The "circumferential direction" is a direction along a circle centered on the center line of each of the inner ring 21 and the outer ring 22. In each drawing, the reference numeral of the center line in a state where the center lines of the inner ring 21 and the outer ring 22 coincide with each other is defined as "C".

The inner ring 21 is an annular member, and an inner ring raceway 25 with which the ball 23 is in rolling contact is formed on an outer peripheral side of the inner ring 21. In the cross section shown in FIG. 5, the inner ring raceway 25 is formed of a groove having a concave arc shape having a radius slightly larger than a radius of the ball 23. Shoulder portions 26 are formed on both axial sides of the inner ring raceway 25 on the outer peripheral side of the inner ring 21.

The outer ring 22 is an annular member, and an outer ring raceway 27 with which the ball 23 is in rolling contact is formed on an inner peripheral side of the outer ring 22. In the cross section shown in FIG. 5, the outer ring raceway 27 is formed of a groove having a concave arc shape having a radius slightly larger than the radius of the ball 23. Shoulder portions 28 are formed on both axial sides of the outer ring raceway 27 on the inner peripheral side of the outer ring 22. An annular space 29 is formed between the inner ring 21 and the outer ring 22.

A plurality of balls 23 is provided between the inner ring raceway 25 and the outer ring raceway 27. When the rolling bearing 20 (inner ring 21) rotates, the balls 23 roll on the inner ring raceway 25 and the outer ring raceway 27. In other words, the rolling bearing 20 includes a contact portion 30 in which the inner ring raceway 25 and the outer ring raceway 27 are in contact with the balls 23 in at least one mode of rolling contact and sliding contact.

In the rolling bearing 20 of the present embodiment, the outer ring 22 is the fixed ring, and the target portion to which the lubricant 13 is supplied is the outer ring raceway 27 of the outer ring 22. By supplying the lubricant 13 to the outer ring raceway 27, the lubricant 13 can be supplied to the ball 23 and the inner ring raceway 25. In the present embodiment, the rolling bearing 20 is described, which has a configuration in which the lubricant 13 is supplied to the outer ring raceway 27 on the fixed ring side in order to supply the lubricant 13 to the contact portion 30. However, the rolling bearing 20 may have a configuration in which the lubricant 13 is supplied to the inner ring raceway 25 on the rotating ring side.

First Disposition Form of Lubricant Supply Device 1

FIG. 5 shows the rolling bearing 20 in which the lubricant supply device 1 is provided in a first disposition form. In the following description, the rolling bearing 20 provided with the lubricant supply device 1 disposed in the first disposition form is referred to as a first rolling bearing 20A. In the first rolling bearing 20A shown in FIG. 5, the porous body 10 is attached to the shoulder portion 28 on a first side of the outer ring 22 in the axial direction. In the first rolling bearing 20A, the porous body 10 having an annular shape is used, and the porous body 10 which is impregnated with the lubricant 13 is fixed to the first side of the outer ring 22, which is the fixed ring, in the axial direction. By fixing the porous body 10 to the outer ring 22 on the fixed ring side, the lubricant 13 can be stably exuded from the porous body 10.

In the lubricant supply device 1, the lubricant 13 stored in the first porous portion 11 can be supplied to the second porous portion 12, and the lubricant 13 can be supplied from the second porous portion 12 to the shoulder portion 28. Then, in the first rolling bearing 20A, the lubricant 13 supplied to the shoulder portion 28 by the lubricant supply device 1 reaches the outer ring raceway 27 (contact portion 30) through the shoulder portion 28 by the suction force of the meniscus.

In the lubricant supply device 1 shown in FIG. 5, the cross section of the porous body 10 is trapezoidal. In other words, the porous body 10 shown in FIG. 5 has a shape in which an axial length on the outer side in the radial direction is longer than an axial length on the inner side in the radial direction. In the first rolling bearing 20A, by forming the porous body 10 in this shape, it is possible to decrease a distance between the second porous portion 12 and the outer ring raceway 27 (contact portion 30) while interference between the ball 23 and the cage 24, and the porous body 10 is avoided. Although different from the mode shown in FIG. 5, more preferably, the porous body 10 is disposed, such that an end portion of a portion of the second porous portion 12 in contact with the shoulder portion 28 on a second side in the axial direction is located on the second side in the axial direction from an end portion of the ball 23 on the first side in the axial direction.

In the rolling bearing 20 shown in FIG. 5, the case where the lubricant supply device 1 is provided on the first side of the outer ring (fixed ring) 22 in the axial direction is described. However, the lubricant supply device 1 may be provided on the second side of the outer ring 22 in the axial direction, or the lubricant supply devices 1 may be provided on both sides of the outer ring 22 in the axial direction, respectively. Further, in the rolling bearing 20 shown in FIG. 5, the case where the lubricant supply device 1 is provided on the outer ring (fixed ring) 22 side is described. However, the lubricant supply device 1 may be provided on the inner ring 21 (rotating ring) side.

As described above, the rolling bearing 20 (first rolling bearing 20A) of the present disclosure includes the inner ring 21 having the inner ring raceway 25, the outer ring 22 having the outer ring raceway 27, and the lubricant supply device 1. The rolling bearing 20 has the contact portion 30 in which the inner ring raceway 25 and the outer ring raceway 27 are in contact with the balls 23 in at least one mode of the rolling contact and sliding contact, and the lubricant 13 is supplied from the lubricant supply device 1 to the contact portion 30. In the rolling bearing 20 of the present disclosure, the lubricant supply device 1 has the first porous portion 11, the second porous portion 12 continuous with the first porous portion 11, and thus, includes the porous body 10 which is impregnated with the lubricant 13. In the rolling bearing 20, the second penetration depth L2 of the lubricant 13 in the second porous portion 12 is larger than the first penetration depth L1 of the lubricant 13 in the first porous portion 11, and the distance between the second porous portion 12 and the contact portion 30 is smaller than the distance between the first porous portion 11 and the contact portion 30.

With this configuration, in the rolling bearing 20 is provided with the lubricant supply device 1, it is possible to supply the lubricant 13 to the contact portion 30 without using grease. Therefore, when the rolling bearing 20 is used, there is no possibility that the grease falls off or is scattered and adheres to an unwanted portion.

Further, in the first rolling bearing 20A of the present disclosure, the porous body 10 is fixed to the fixed ring out of the outer ring 22 and the inner ring 21. In this case, in the rolling bearing 20 provided with the lubricant supply device 1, the lubricant 13 can be stably supplied to the contact portion 30 regardless of the rotation of the rotating ring of the outer ring 22 or the inner ring 21.

Second Disposition Form of Lubricant Supply Device 1

Figure 6:
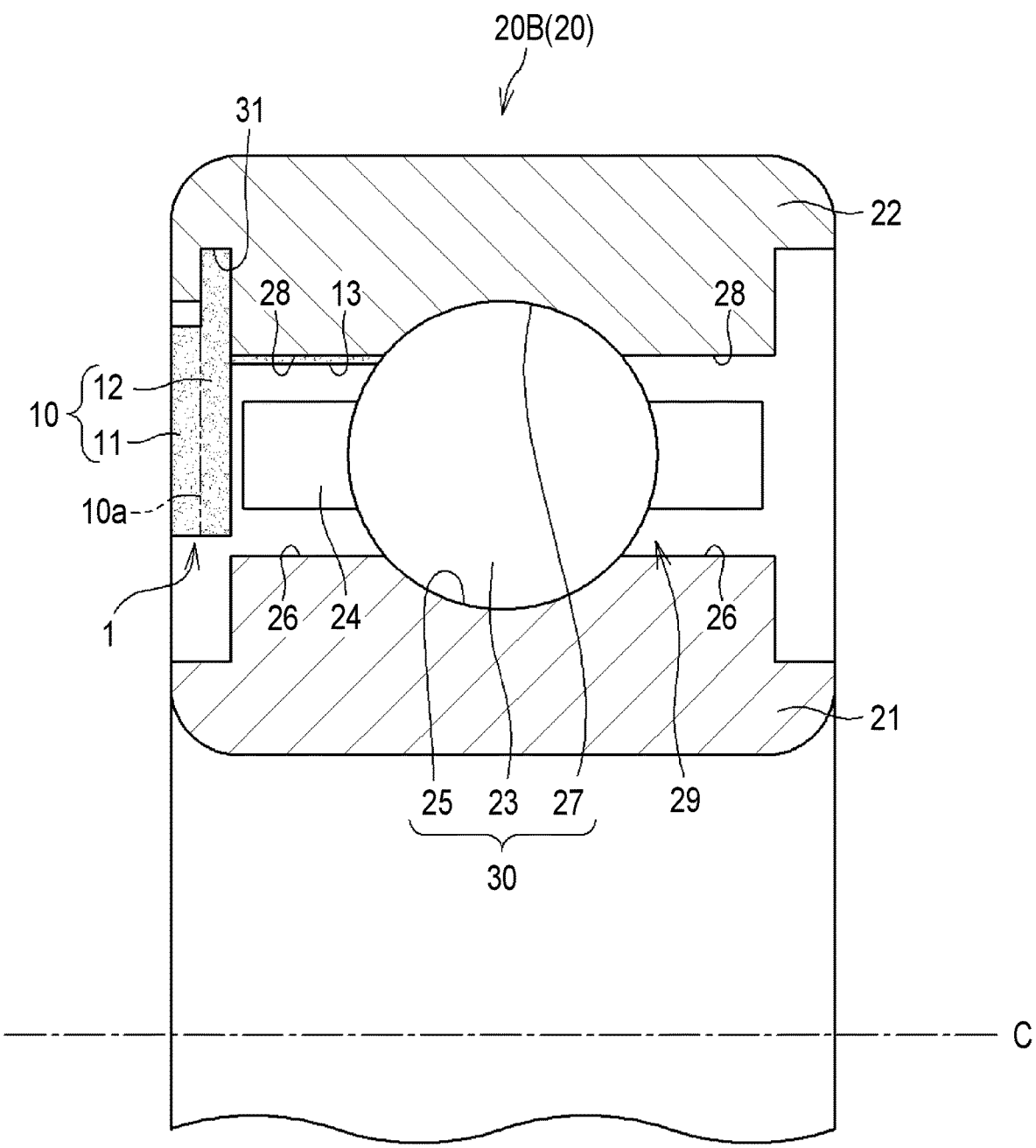
FIG. 6 is a schematic view showing a second rolling bearing provided with the lubricant supply device.

FIG. 6 shows the rolling bearing 20 in which the lubricant supply device 1 is provided in a second disposition form. In the following description, the rolling bearing 20 provided with the lubricant supply device 1 in the second disposition form is referred to as a second rolling bearing 20B. In the second rolling bearing 20B shown in FIG. 6, a groove portion 31 is formed on the inner peripheral side of the shoulder portion 28 on the first side of the outer ring 22 in the axial direction. In the second rolling bearing 20B shown in FIG. 6, the same reference numerals are given to the same configurations as those described in FIG. 5, and the description thereof will be omitted.

As shown in FIG. 6, in the second rolling bearing 20B, the annular porous body 10 is used. The porous body 10 shown in FIG. 6 has the first porous portion 11 and the second porous portion 12 which are annular respectively. The porous portions 11, 12 are disposed concentrically and disposed side by side in the axial direction. The inner diameters of the porous portions 11, 12 are equal to each other. Further, the outside diameter of the second porous portion 12 is larger than the outside diameter of the first porous portion 11. In the second rolling bearing 20B, a radial outer portion (a portion having an outside diameter larger than that of the first porous portion 11) of the second porous portion 12 is fitted into the groove portion 31, and thus, the porous body 10 is fixed on the first side of the outer ring 22 in the axial direction.

In the second rolling bearing 20B, the porous body 10 which is impregnated with the lubricant 13 is provided, such that the first porous portion 11 is disposed on the first side in the axial direction and the second porous portion 12 is disposed on the second side in the axial direction. Therefore, in the second rolling bearing 20B, a distance between the second porous portion 12 and the contact portion 30 is smaller than a distance between the first porous portion 11 and the contact portion 30. Then, in the second rolling bearing 20B, the lubricant 13 stored in the first porous portion 11 is absorbed by the second porous portion 12, and the lubricant 13 can be supplied from the second porous portion 12 to the shoulder portion 28. Then, in the second rolling bearing 20B, the lubricant 13 supplied to the shoulder portion 28 by the lubricant supply device 1 reaches the outer ring raceway 27 (contact portion 30) through the shoulder portion 28 by the suction force of the meniscus.

The second rolling bearing 20B of the present disclosure described above includes the contact portion 30 in which the outer ring raceway 27 and the inner ring raceway 25 are in contact with the ball 23 in at least one mode of rolling contact and sliding contact. Then, in the second rolling bearing 20B, the porous body 10 is disposed at an axial end portion of the outer ring 22 or the inner ring 21 (in the present embodiment, the outer ring 22). In this case, in the rolling bearing 20 provided with the lubricant supply device 1, the lubricant 13 can be supplied to the contact portion 30 between the inner ring 21 and the outer ring 22, and the ball 23 without using grease.

In the second rolling bearing 20B, the porous body 10 is disposed at the axial end portion of the outer ring 22. In this case, it is easier to suppress an increase in an axial dimension of the rolling bearing 20 as compared with the case where the porous body 10 is disposed inside the bearing (refer to FIG. 5). Therefore, in the second rolling bearing 20B of the present disclosure, the rolling bearing 20 provided with the lubricant supply device 1 can be compactly configured.

Third Disposition Form of Lubricant Supply Device 1

Figure 7:
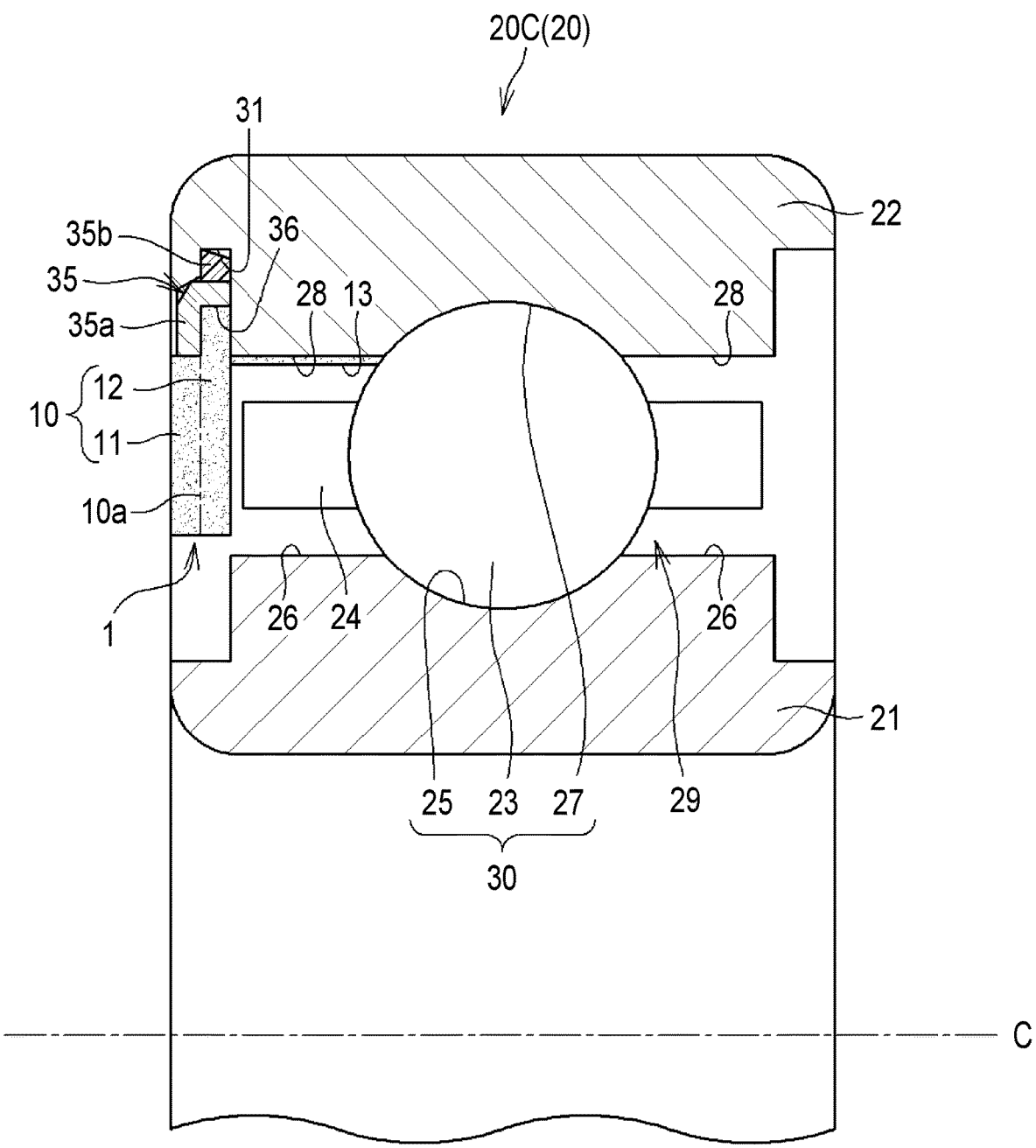
FIG. 7 is a schematic view showing a third rolling bearing provided with the lubricant supply device.

FIG. 7 shows the rolling bearing 20 in which the lubricant supply device 1 is provided in a third disposition form. In the following description, the rolling bearing 20 provided with the lubricant supply device 1 in the third disposition form is referred to as a third rolling bearing 20C. In the third rolling bearing 20C shown in FIG. 7, a mode in which the lubricant supply device 1 is fixed to the outer ring 22 is different from that of the second rolling bearing 20B (refer to FIG. 6). In the third rolling bearing 20C, the lubricant supply device 1 is attached to an end portion on the first side of the outer ring 22 in the axial direction using an annular member 35. In the third rolling bearing 20C shown in FIG. 7, the same reference numerals are given to the same configurations as those described in FIGS. 5 and 6, and the description thereof will be omitted.

As shown in FIG. 7, the annular member 35 has an annular portion 35a and an outer peripheral edge portion 35b which are annular respectively. In the annular member 35 of the present embodiment, the annular portion 35a is made of metal and has a substantially L-shaped cross section including the center line C. In the annular member 35 of the present embodiment, the outer peripheral edge portion 35b is made of an elastic resin and has a shape that can be fitted into the groove portion 31. Examples of the annular member 35 may include a member obtained by processing a seal member used for sealing the inside of a rolling bearing. Further, in the annular member 35, the entire portion including the outer peripheral edge portion 35b may be made of metal.

In the third rolling bearing 20C, the outer peripheral edge portion 35b is fitted into the groove portion 31 on the first side of the outer ring 22 in the axial direction, and the annular member 35 is fixed to the outer ring 22. A groove portion 36 is formed between the annular portion 35a of the annular member 35 fixed to the outer ring 22 and the outer ring 22. Then, in the third rolling bearing 20C, the porous body 10 which is impregnated with the lubricant 13 is disposed in the groove portion 36 between the axially inner side of the annular member 35 and the outer ring 22, and the porous body 10 is sandwiched by the annular portion 35a and the outer ring 22 and fixed. In the third rolling bearing 20C, as described above, the porous body 10 is disposed at the axial end portion of the outer ring 22 that is a fixed ring.

Due to elasticity of the outer peripheral edge portion 35b of the annular member 35, the annular portion 35a can swing with the end portion on the outer peripheral edge portion 35b side as a fulcrum. Then, in the third rolling bearing 20C, a groove width (a length of the groove portion 36 in the axial direction) of the groove portion 36 can be changed. Therefore, when the porous body 10 is fixed to the outer ring 22 using the annular member 35, even when the shape and size of the porous body 10 are changed, the porous body 10 is interposed between the annular portion 35a and the outer ring 22, and thus, the porous body 10 can be easily fixed to the outer ring 22. Further, even when the porous body 10 is made of an elastic material, such as a resin, and the shape of the porous body 10 is easily deformed, the porous body 10 can be easily fixed to the outer ring 22 using the annular member 35.

The third rolling bearing 20C of the present disclosure described above further includes the annular member 35 fixed to the axial end portion of the fixed ring out of the outer ring 22 and the inner ring 21. Then, in the third rolling bearing 20C, the porous body 10 is disposed between the axially inner side of the annular member 35 and the outer ring (fixed ring) 22, and is sandwiched by the annular member 35 and the outer ring 22. With the configuration, in the rolling bearing 20 provided with the lubricant supply device 1, the porous body 10 can be easily provided at the axial end portion of the outer ring 22.

Fourth Disposition Form of Lubricant Supply Device 1

Figure 8:
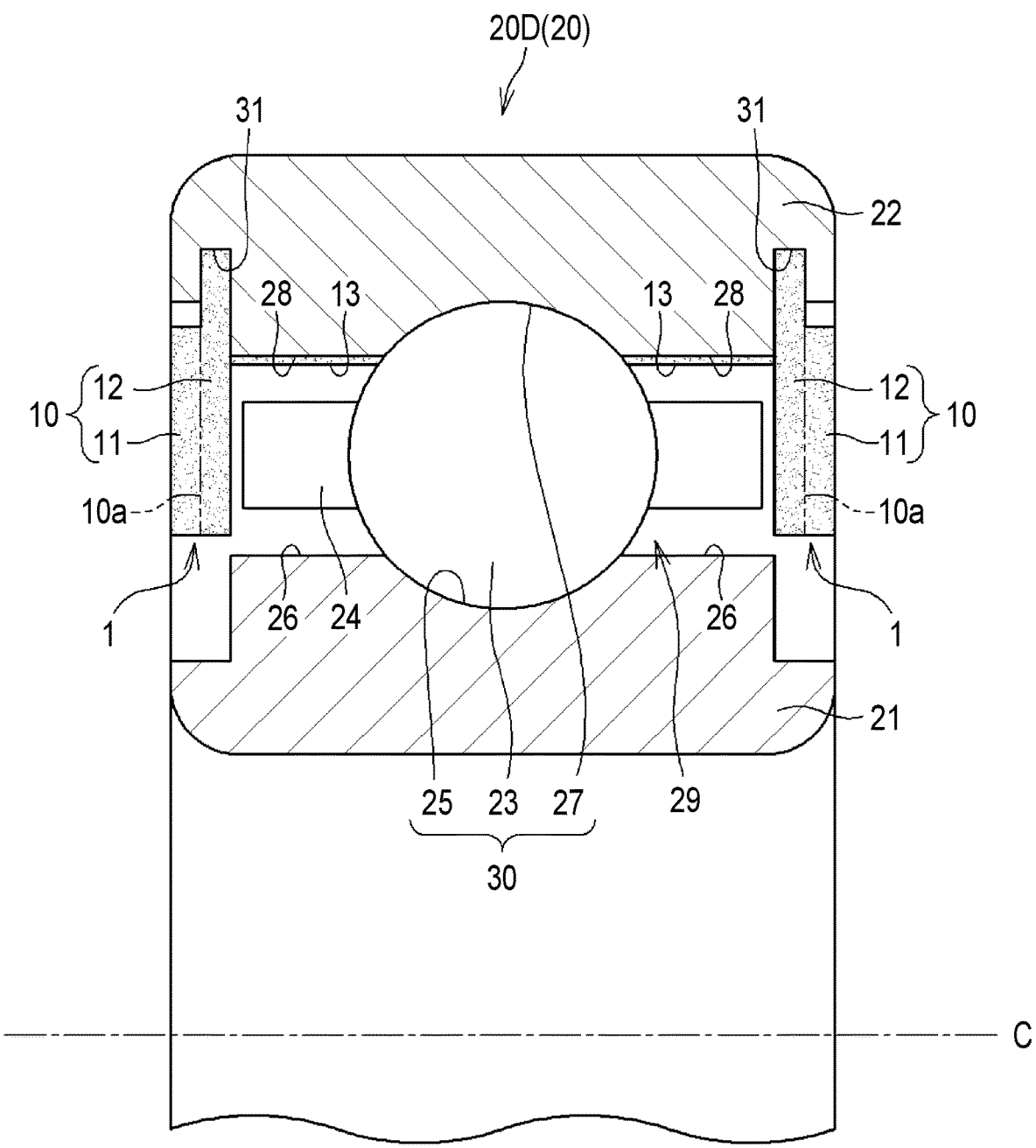
FIG. 8 is a schematic view showing a fourth rolling bearing provided with the lubricant supply device.

FIG. 8 shows the rolling bearing 20 in which the lubricant supply device 1 is provided in a fourth disposition form. In the following description, the rolling bearing 20 provided with the lubricant supply device 1 in the fourth disposition form is referred to as a fourth rolling bearing 20D. In the fourth rolling bearing 20D shown in FIG. 8, groove portions 31 are formed at both axial end portions of the outer ring 22, respectively. The fourth rolling bearing 20D is different from the second rolling bearing 20B (refer to FIG. 6) in that the outer ring 22 has the lubricant supply devices 1 at both axial end portions. In the fourth rolling bearing 20D shown in FIG. 8, the same reference numerals are given to the same configurations as those described in FIGS. 5 to 7, and the description thereof will be omitted.

In the fourth rolling bearing 20D, the porous body 10 (lubricant supply device 1) is fitted into the groove portion 31 on each of the first side and the second side of the outer ring 22 in the axial direction. In the porous body 10 on the first side in the axial direction, the first porous portion 11 is disposed on the first side in the axial direction, and the second porous portion 12 is disposed on the second side in the axial direction. Further, in the porous body 10 on the second side in the axial direction, the first porous portion 11 is disposed on the second side in the axial direction, and the second porous portion 12 is disposed on the first side in the axial direction.

Therefore, in the fourth rolling bearing 20D, in each of the porous bodies 10 disposed at both axial end portions of the outer ring 22, the distance between the second porous portion 12 and the contact portion 30 is smaller than the distance between the first porous portion 11 and the contact portion 30. Then, in the fourth rolling bearing 20D, the lubricant 13 stored in each of the first porous portions 11 at both axial end portions of the outer ring 22 is absorbed by each of the second porous portions 12, and the lubricant 13 can be supplied from each of the second porous portions 12 to each of the shoulder portions 28.

In the lubricant supply device 1, when the amount of the lubricant 13 retained in the porous body 10 is large, the lubricant 13 can be supplied from the porous body 10 to the contact portion 30. Further, in the lubricant supply device 1, when the amount of the lubricant 13 retained in the porous body 10 is small, the lubricant 13 existing in the contact portion 30 can be absorbed into the porous body 10. Therefore, in the fourth rolling bearing 20D, the lubricant 13 is supplied to the contact portion 30 and the lubricant 13 existing in the contact portion 30 can be absorbed by the lubricant supply devices 1 provided at both axial end portions. Each of the lubricant supply devices 1 has a function of adjusting the amount of the lubricant 13 existing in the contact portion 30 to be substantially constant.

In the fourth rolling bearing 20D, by providing the porous bodies 10 at both axial end portions of the outer ring 22, each of the porous bodies 10 has a function of suppressing leakage of the lubricant 13 from the annular space 29 (also referred to as "inside of bearing") to the outside (also referred to as "outside of bearing"). Further, in the fourth rolling bearing 20D, each of the porous bodies 10 also has a function of suppressing foreign matters outside the bearing entering the inside of the bearing.

In the fourth rolling bearing 20D of the present disclosure described above, the porous bodies 10 are disposed at both axial end portions of the outer ring 22 or the inner ring 21 (in the present embodiment, the outer ring 22). In this case, the lubricant 13 can be supplied to the contact portion 30 from both sides in the axial direction. Therefore, uneven supply of the lubricant 13 to the contact portion 30 in the axial direction can be suppressed. Further, the porous body 10 can be used as a substitute for a sealing device to suppress the leakage of the lubricant 13 from the inside of the bearing to the outside thereof.

Fifth Disposition Form of Lubricant Supply Device 1

Figure 9:
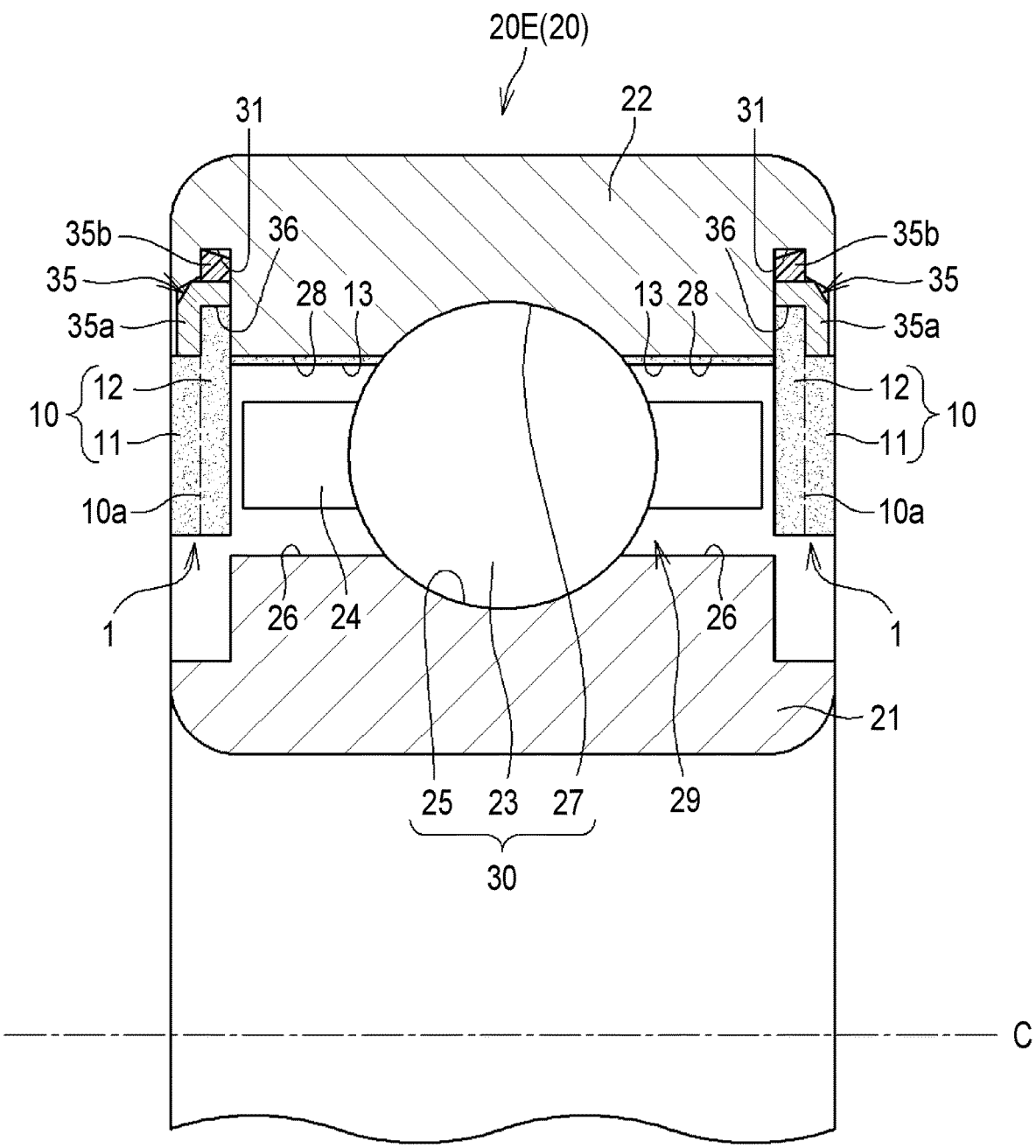
FIG. 9 is a schematic view showing a fifth rolling bearing provided with the lubricant supply device.

FIG. 9 shows the rolling bearing 20 in which the lubricant supply device 1 is provided in a fifth disposition form. In the following description, the rolling bearing 20 provided with the lubricant supply device 1 in the fifth disposition form is referred to as a fifth rolling bearing 20E. The fifth rolling bearing 20E shown in FIG. 9 is different from the fourth rolling bearing 20D (refer to FIG. 8) in that the annular members 35 are used and lubricant supply devices 1 are provided at both axial end portions of the outer ring 22. When the annular members 35 are used, each porous body 10 is interposed between the annular portion 35a and the outer ring 22, and thus, the porous bodies 10 can be easily fixed at both axial end portions of the outer ring 22. In the fifth rolling bearing 20E shown in FIG. 9, the same reference numerals are given to the same configurations as those described in FIGS. 5 to 8, and the description thereof will be omitted.

In the fifth rolling bearing 20E of the present disclosure described above, the annular members 35 are disposed at both axial end portions of the outer ring 22. In this case, in the rolling bearing 20 provided with the lubricant supply device 1, the porous bodies 10 can be easily provided at both axial end portions of the outer ring 22.

The lubricant supply device 1 is applicable to the rolling bearing 20 as described above. Moreover, the lubricant supply device 1 is applicable to other rolling sliding devices, such as slide bearings and gears.

The embodiments disclosed here are exemplary in all respects and are not restrictive. A technical scope of the present disclosure is not limited to the above-described embodiments, and a technical scope includes all modifications within a range equivalent to configurations described in claims.

What is claimed is:

1. A lubricant supply device comprising:
a porous body including a first porous portion and a second porous portion in contact with the first porous portion, the porous body being impregnated with a lubricant, wherein a penetration depth of the lubricant in the second porous portion is larger than a penetration depth of the lubricant in the first porous portion.

2. The lubricant supply device according to claim 1, wherein:
the first porous portion has a first mean pore diameter; and
the second porous portion has a second mean pore diameter that is larger than the first mean pore diameter.

3. The lubricant supply device according to claim 1, wherein:
the first porous portion has a first surface tension; and
the second porous portion has a second surface tension that is larger than the first surface tension.

4. The lubricant supply device according to claim 1, wherein:
the first porous portion has a first porosity; and
the second porous portion has a second porosity that is smaller than the first porosity.

5. The lubricant supply device according to claim 1, wherein:
each of the first porous portion and the second porous portion is a portion of the porous body.

6. The lubricant supply device according to claim 1, wherein:
the first porous portion is formed of a first porous body; and
the second porous portion is formed of a second porous body that is separate from the first porous body.

7. A method for manufacturing a lubricant supply device including a porous body including a first porous portion and a second porous portion in contact with the first porous portion, the porous body being impregnated with a lubricant, a penetration depth of the lubricant of the second porous portion being larger than a penetration depth of the lubricant of the first porous portion, the method comprising:
compressing one porous material to form the porous body including the second porous portion that is a compressed portion of the one porous material and the first porous portion that is a portion having a smaller degree of compression than that of the second porous portion.

8. A method for manufacturing a lubricant supply device including a porous body including a first porous portion and a second porous portion in contact with the first porous portion, the porous body being impregnated with a lubricant, a penetration depth of the lubricant of the second porous portion being larger than a penetration depth of the lubricant of the first porous portion, the method comprising:
bringing a first porous body constituting the first porous portion and a second porous body constituting the second porous portion into close contact with each other to form the porous body.

9. A rolling sliding device comprising:
a first rolling sliding member that has a first rolling sliding portion;
a second rolling sliding member that has a second rolling sliding portion;
a lubricant supply device; and
a contact portion in which the first rolling sliding portion and the second rolling sliding portion come into contact with each other in at least one mode of rolling contact and sliding contact, wherein:
a lubricant is supplied from the lubricant supply device to the contact portion;
the lubricant supply device has a first porous portion, a second porous portion continuous with the first porous portion, and a porous body which is impregnated with the lubricant;
a penetration depth of the lubricant in the second porous portion is larger than a penetration depth of the lubricant in the first porous portion; and
a distance between the second porous portion and the contact portion is smaller than a distance between the first porous portion and the contact portion.

10. The rolling sliding device according to claim 9, wherein:
when the rolling sliding device is a rolling bearing including an inner ring that is the first rolling sliding member, an outer ring that is the second rolling sliding member, and a rolling element disposed between the inner ring and the outer ring, an inner ring raceway that is the first rolling sliding portion and an outer ring raceway that is the second rolling sliding portion are the contact portion that is in contact with the rolling element in at least one mode of the rolling contact and sliding contact, and
the porous body is disposed at an axial end portion of the inner ring or the outer ring.

11. The rolling sliding device according to claim 10, wherein:
the porous body is disposed at each of both axial end portions of the inner ring or the outer ring.

12. The rolling sliding device according to claim 10, wherein:
the porous body is fixed to a fixed ring comprising one of the inner ring and the outer ring.

13. The rolling sliding device according to claim 12, further comprising:
an annular member that is fixed to an axial end portion of the fixed ring comprising one of the inner ring and the outer ring, wherein
the porous body is disposed between an axially inner side of the annular member and the fixed ring and is sandwiched by the annular member and the fixed ring.

14. The rolling sliding device according to claim 13, wherein:
the annular member is disposed at each of both axial end portions of the fixed ring.

* * * * *